(12) United States Patent
Baird et al.

(10) Patent No.: US 8,208,003 B2
(45) Date of Patent: Jun. 26, 2012

(54) MINIMIZING FAST VIDEO UPDATE REQUESTS IN A VIDEO CONFERENCING SYSTEM

(75) Inventors: Randall B. Baird, Austin, TX (US); Ryan Knotts, Sunnyvale, CA (US); Thiyagesan Ramalingam, Milipitas, CA (US); Manjunath S. Bangalore, San Jose, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1495 days.

(21) Appl. No.: 11/728,130

(22) Filed: Mar. 23, 2007

(65) Prior Publication Data

US 2008/0231687 A1 Sep. 25, 2008

(51) Int. Cl.
*H04N 7/15* (2006.01)
(52) U.S. Cl. .................. 348/14.09; 348/14.08
(58) Field of Classification Search ............ 348/14.09, 348/14.08, 14.01; 370/260
See application file for complete search history.

(56) References Cited

U.S. PATENT DOCUMENTS

| | | | |
|---|---|---|---|
| 5,483,587 A | 1/1996 | Hogan et al. | |
| 5,600,366 A | 2/1997 | Schulman | |
| 5,673,253 A | 9/1997 | Shaffer | |
| 5,729,687 A | 3/1998 | Rothrock et al. | |
| 5,917,830 A | 6/1999 | Chen et al. | |
| 5,963,217 A | 10/1999 | Grayson et al. | |
| 6,044,081 A | 3/2000 | Bell et al. | |
| 6,141,324 A | 10/2000 | Abbott et al. | |
| 6,236,854 B1 | 5/2001 | Bradshaw | |
| 6,269,107 B1 | 7/2001 | Jong | |
| 6,332,153 B1 | 12/2001 | Cohen | |
| 6,501,739 B1 | 12/2002 | Cohen | |
| 6,505,169 B1 | 1/2003 | Bhgavath et al. | |
| 6,608,820 B1 | 8/2003 | Bradshaw | |
| 6,671,262 B1 | 12/2003 | Kung et al. | |
| 6,675,216 B1 | 1/2004 | Quatrano et al. | |
| 6,718,553 B2 | 4/2004 | Kenworthy | |
| 6,735,572 B2 | 5/2004 | Landesmann | |
| 6,771,644 B1 | 8/2004 | Brassil et al. | |
| 6,771,657 B1 | 8/2004 | Elstermann | |
| 6,775,247 B1 | 8/2004 | Shaffer et al. | |
| 6,816,469 B1 | 11/2004 | Kung et al. | |
| 6,865,540 B1 | 3/2005 | Faber et al. | |
| 6,876,734 B1 | 4/2005 | Summers et al. | |

(Continued)

FOREIGN PATENT DOCUMENTS

EP  1 553 735 A1  7/2005

*Primary Examiner* — Stella Woo
(74) *Attorney, Agent, or Firm* — Baker Botts L.L.P.

(57) ABSTRACT

In one embodiment, a method includes dropping an initial series of video frames received by a video conferencing system from a first endpoint that has entered a video conference session as a first participant. One or more fast video update (FVU) messages received by the video conferencing system from the first endpoint during an enabling time period are then discarded. A single FVU message is then to the first endpoint after the video conferencing system has become enabled with respect to the first endpoint. An I-frame received from the first endpoint in response to the single FVU message is then sent back to the first endpoint. It is emphasized that this abstract is provided to comply with the rules requiring an abstract that will allow a searcher or other reader to quickly ascertain the subject matter of the technical disclosure.

26 Claims, 7 Drawing Sheets

U.S. PATENT DOCUMENTS

| | | |
|---|---|---|
| 6,925,068 B1 | 8/2005 | Stanwood et al. |
| 6,931,001 B2 | 8/2005 | Deng |
| 6,931,113 B2 | 8/2005 | Ortel |
| 6,937,569 B1 | 8/2005 | Sarkar et al. |
| 6,947,417 B2 | 9/2005 | Laursen et al. |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,084,898 B1 | 8/2006 | Firestone et al. |
| 2001/0000540 A1 | 4/2001 | Cooper et al. |
| 2003/0076850 A1 | 4/2003 | Jason, Jr. |
| 2003/0198195 A1 | 10/2003 | Li |
| 2004/0165710 A1 | 8/2004 | DelHoyo et al. |
| 2004/0213152 A1 | 10/2004 | Matuoka et al. |
| 2005/0069102 A1 | 3/2005 | Chang |
| 2007/0064901 A1* | 3/2007 | Baird et al. .............. 379/202.01 |

* cited by examiner

MINIMIZING FAST VIDEO UPDATE REQUESTS IN A VIDEO CONFERENCING SYSTEM

TECHNICAL FIELD

The present disclosure relates generally to the fields of video switching and video conferencing.

BACKGROUND

Video conferencing typically involves video media transmitted in a certain format, such as an H.264 data stream, over a packet-based network. H.264 video streams comprise different types of frames, but not all frames include all of the data to be displayed at any given time. For instance, Inter-frames, or I-frames, are the only type of frame that is not coded with reference to any other frame; P-frames are coded predictively from a previous I-frame or P-frame; and B-frames are coded predictively from I-frames and P-frames.

In a switched video conferencing system, there are a variety of situations that require the sending of a Fast Video Update (FVU) message, also referred to as an inter-frame request, to accelerate the transmission of an I-frame from a video source. These situations are significantly different from those encountered in a traditional Multipoint Conferencing Unit (MCU). In an MCU that decodes the source video streams and then re-encodes a new stream to be sent to one or more destinations, packet loss or corruption only extends between the MCU and a single endpoint. Alternatively, in a voice-activated video switching system, the sending of an FVU by one or more destination endpoints may need to extend through the conferencing system and propagate all the way back to a source endpoint. This end-to-end propagation of FVUs can cause more FVUs to be sent to a source than necessary, which may result in bandwidth overruns or even congestive collapse of a source stream as unwanted FVUs cause the encoder to generate too many I-frames.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the disclosure herein. However, persons having ordinary skill in the relevant arts will appreciate that these specific details may not be needed to practice the embodiments described.

In the context of the present application, a communication network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the endpoint devices or nodes may include servers, video conferencing units, video terminals, and personal computers. The nodes typically communicate by exchanging discrete frames or packets of data according to predefined protocols.

In general, an endpoint is a device that provides rich-media communications termination to an end user, client, or person who is capable of participating in an audio or video conference session via conferencing system. Endpoint devices that may be used to initiate or participate in a conference session include a personal digital assistant (PDA); a personal computer (PC), such as notebook, laptop, or desktop computer; an audio/video appliance; a streaming client; a television device with built-in camera and microphone; or any other device, component, element, or object capable of initiating or participating in exchanges with a video conferencing system.

Figure 7:
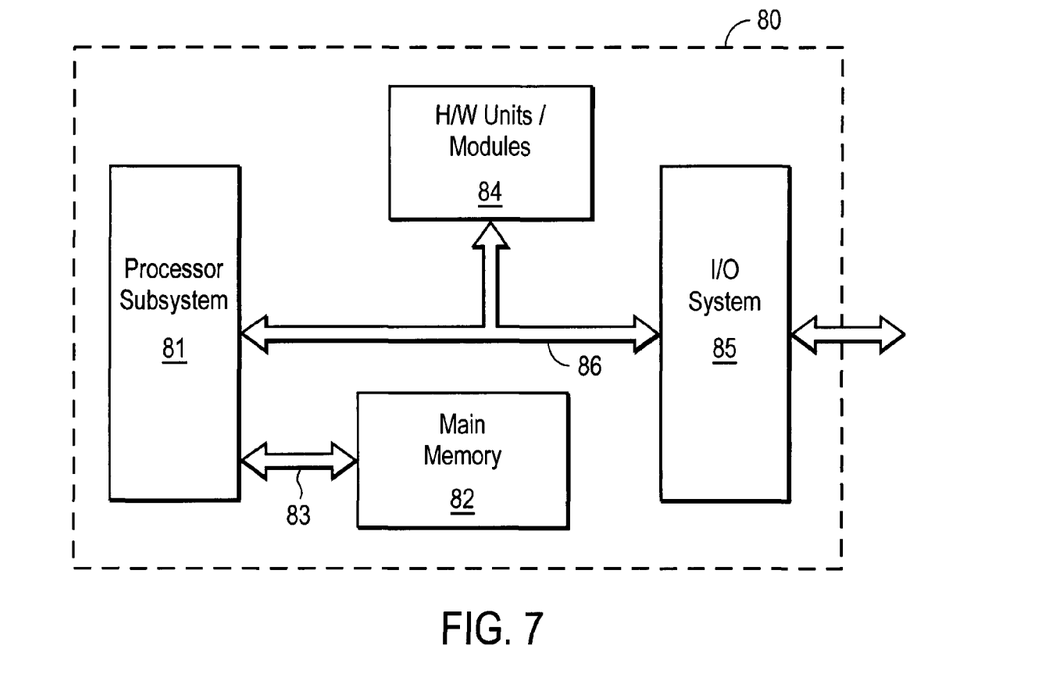
FIG. 7 illustrates basic components of an example node or network device.

FIG. 7 illustrates basic components of an example node or network device 80, which typically comprises a number of basic subsystems that includes a processor subsystem 81, a main memory 82 and an input/output (I/O) subsystem 85. Data is transferred between main memory ("system memory") 82 and processor subsystem 81 over a memory bus 83, and between the processor and I/O subsystems over a system bus 86. Examples of the system bus may include the conventional lightning data transport (or hyper transport) bus and the conventional peripheral component interconnect (PCI) bus. Device 80 may also comprise other hardware units/modules 84 coupled to system bus 86 for performing additional functions consistent with the methods and operations described herein. Processor subsystem 81 may comprise one or more processors and a controller device that incorporates a set of functions including a system memory controller, support for one or more system buses and direct memory access (DMA) engines.

It is appreciated that any video switching or mixing component utilized by node 80 may comprise separate hardware devices coupled to the system bus 86, or, alternatively, implemented as software programs or modules 84 that run on one or more processors of subsystem 81. In other words, the methods and functions described above may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

Figure 1:
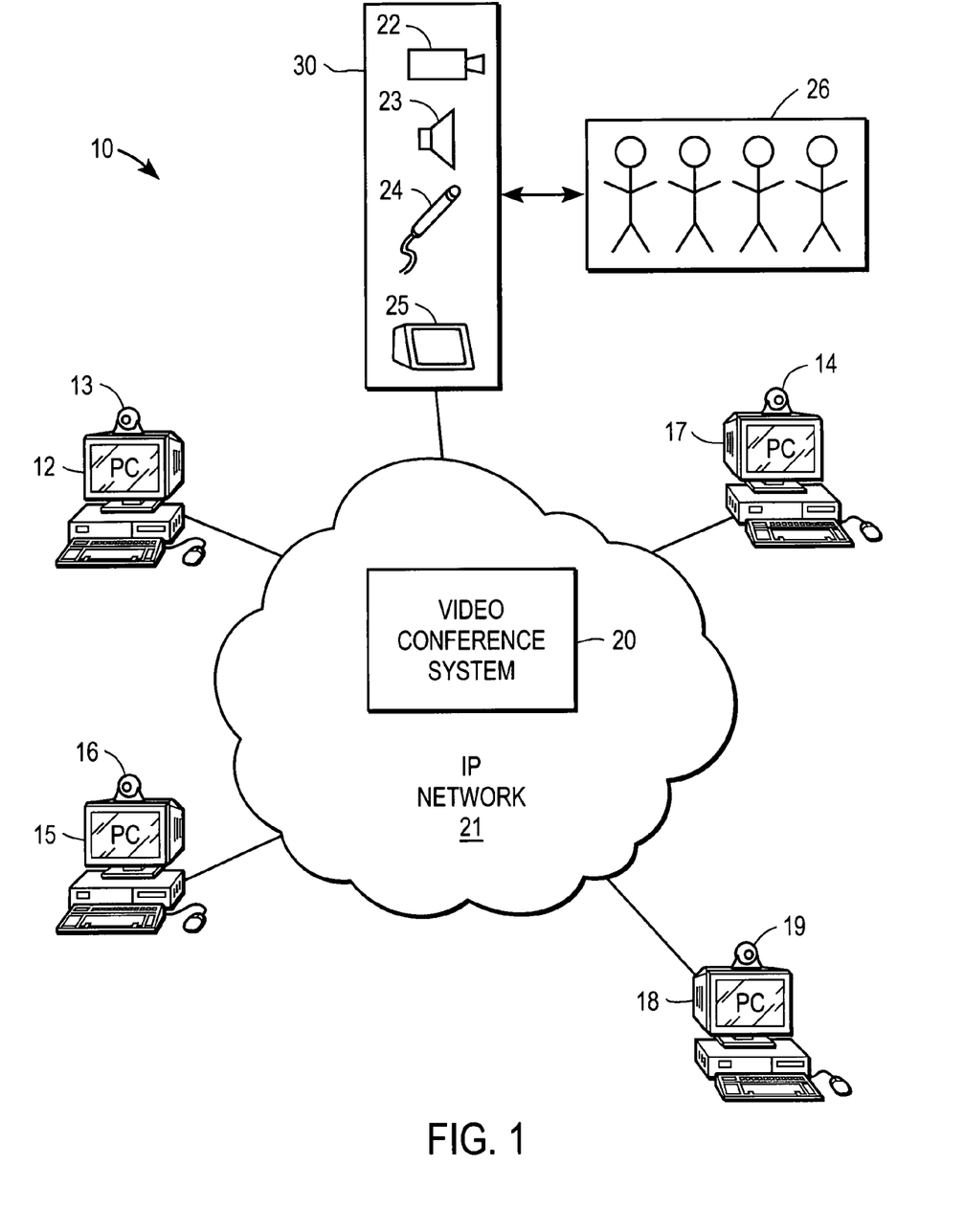
FIG. 1 illustrates an example a network-based communication system.

FIG. 1 illustrates an example network-based communications system 10 that includes a video conferencing system 20 located on an Internet protocol (IP) network 21. Video conference system 20 may comprise a conferencing or meeting application that includes software (or firmware) plug-ins, modules, or enhancements that implement the various features and functions described herein. In a specific implementation, for example, conferencing system 20 may run a modified or enhanced IP communication system software product such as Cisco's MeetingPlace™ conferencing application that allows users to schedule and attend meeting conferences. In the embodiment shown, conference system 20 handles all of the control plane functions of the switched video conference session and manages audio transmissions and communications from the endpoints. By way of example, video conference system 20 may include a digital signal processor (DSP) or firmware/software-based system that mixes and/or switches audio and video media received at its input ports under the control of a conferencing server or other network node.

System 20 may include an audio mixer and a video switching device or video mixer responsible for receiving media packet streams from the plurality of endpoints, processing and mixing the streams and sending mixed and/or switched streams back to the plurality of endpoints. In other words, although the conferencing system or conference service is shown in FIG. 1 as a single box or entity, in various embodiments system 20 may comprise one or more media switches, a stream controller, a conferencing server, authentication/admission applications, etc. On the other hand, in one embodiment the mixing and switching components of video conference system 20 may comprise separate logical entities implemented on a single hardware unit or box. In other embodiments, certain functions and operational methods of system 20 may also be implemented by interconnected or integrated audio bridge and video MCU components.

It should also be understood that switching of video streams in the architecture of FIG. 1 is voice-activated; that is, control of the FVUs sent and the video streams output by system 20 occurs based on speech received from various participants. Put differently, the methods described herein may apply to a voice-activated video switching system where the video streams associated with an active and a previous speaker are switched to various endpoints based on detected speech of those participants. As such, conferencing system 20 may also incorporate or be associated with a natural language automatic speech recognition (ASR) module for interpreting and parsing speech of the participants, and standard speech-to-text (STT) and text-to-speech (TTS) converter modules.

It is appreciated that in different specific implementations the media path for the conference participants may include audio/video transmissions, e.g., Real-Time Transport Protocol (RTP) packets sent across a variety of different networks (e.g., Internet, intranet, etc.), protocols (e.g., IP, Asynchronous Transfer Mode (ATM), Point-to-Point Protocol (PPP)), with connections that span across multiple services, systems, and devices. The connections between the server/mixer and each of the endpoints may be over any communications protocol appropriate for multimedia services over packet networks, e.g., Session Initiation Protocol (SIP), the H.323 standard, etc. Non-standard signaling protocols, such as the Skinny Client Control Protocol (SCCP), or non-standard protocols based on Extensible Mark-up Language (XML) over Hyper Text Transfer Protocol (HTTP) or Simple Object Access Protocol (SOAP) may also be used to set up the connections.

In the embodiment of FIG. 1, endpoints 12, 15, 17 and 18 each comprise a personal computer (PC) with a microphone (not shown) and a camera for capturing video images of a user. For instance, cameras 13, 16, 14 and 19 are shown respectively attached to the top of PCs 12, 15, 17 and 18. Endpoint 30 comprises a conferencing unit that includes a camera 22, loudspeaker 23, microphone 24 and display monitor 25, each of which is connected with video conferencing server 20. A group 25 of individuals collectively participates in the video conference session via endpoint 30.

Each of endpoint devices includes a processor and executable code that supports the functionality described herein. In this example, endpoints 12, 15, 17, 18 and 30 are both sources and sinks of audio and video content. That is, in addition to sending audio packet streams to server 20, each of the endpoints also outputs a video packet stream comprising video data received from a camera associated with the endpoint. In one embodiment, audio/video packets originating from each of the conference or meeting participants, e.g., individual conference participants using endpoint devices 12, 15, 17, and 18, are received at the ports of a conference server or bridge. The conference server then mixes the received audio/video content in some manner and then sends appropriately mixed media streams back to the various endpoints.

As part of the process of mixing/switching the media transmissions of conference participants, system 20 may create different output media streams having different combinations of speakers for different participants. For example, in the case where endpoint 15 is one of the active (e.g., loudest) speakers in the conference session, system 20 may generate mixed audio and switched video outputs to endpoint 15 that do not include the audio and video output from that endpoint. On the other hand, the media streams output to endpoints 12, 17, 18 and 30 includes the audio/video generated by endpoint 15 since endpoint 15 is currently an active speaker. In this way, endpoint 15 does not receive an echo of its own audio output coming back from the audio mixer.

Figure 2:
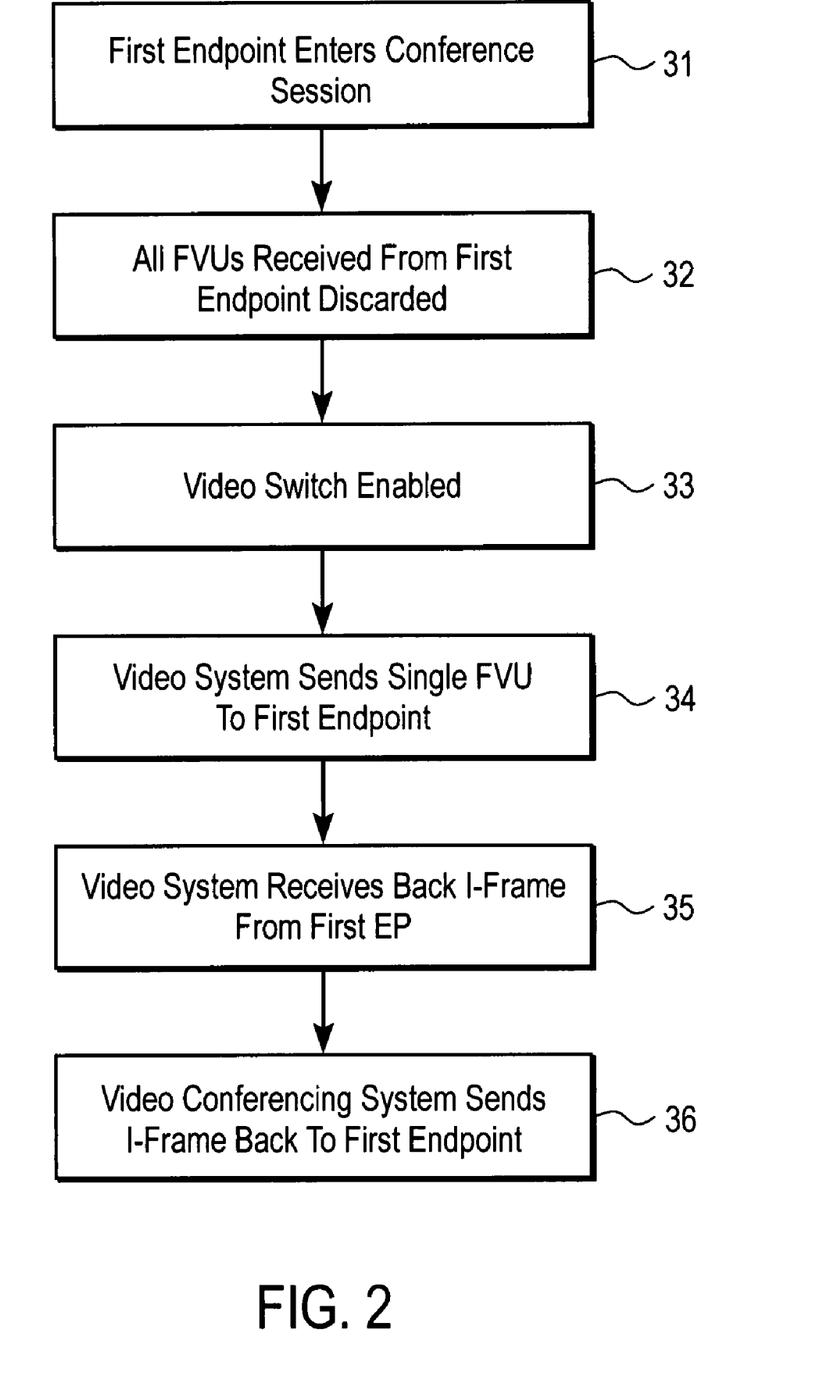
FIG. 2 illustrates an example method of fast video update for a voice-activated video switching system, such as that shown in FIG. 1.

FIG. 2 illustrates an example method of fast video update (FVU) for a voice-activated video switching system, such as that shown in FIG. 1. In this example, a participant (i.e., a first endpoint) enters a video conference session as the first participant (block 31). In other words, the conference session at this point consists of just one video participant. Immediately upon dialing into the system, the first endpoint typically sends out an I-frame in order to synchronize transmissions with the video switch and receive back his reflected video image. But because it normally takes some time for the video switch to become enabled after the video session first begins, the initial I-frame received from the endpoint is usually dropped. This may cause the endpoint to send a series of FVUs to the video system. Instead of processing or responding to any FVUs received from the first endpoint, the system simply discards all of them (block 32) until a short time (e.g., 1-2 seconds) after the video switch has been properly enabled (block 33).

Once the video switch has been enabled, the video system sends a single FVU to the first endpoint (block 34). In response to receiving the FVU sent by the conferencing system, the first endpoint sends out an I-frame, which is then received by the video system (block 35). The video conferencing server then sends the same I-frame back to the first endpoint (block 36). At this point, the endpoint is synchronized with the video system. To put it differently, when an endpoint is the first one to enter into a video conference session, the video image initially received from the endpoint by the video system is suppressed until after the video switch becomes enabled. At that point, the system sends out an FVU to the endpoint and receives an I-frame in return. The video system then sends the I-frame back to the endpoint as a reflected video image.

Figure 3:
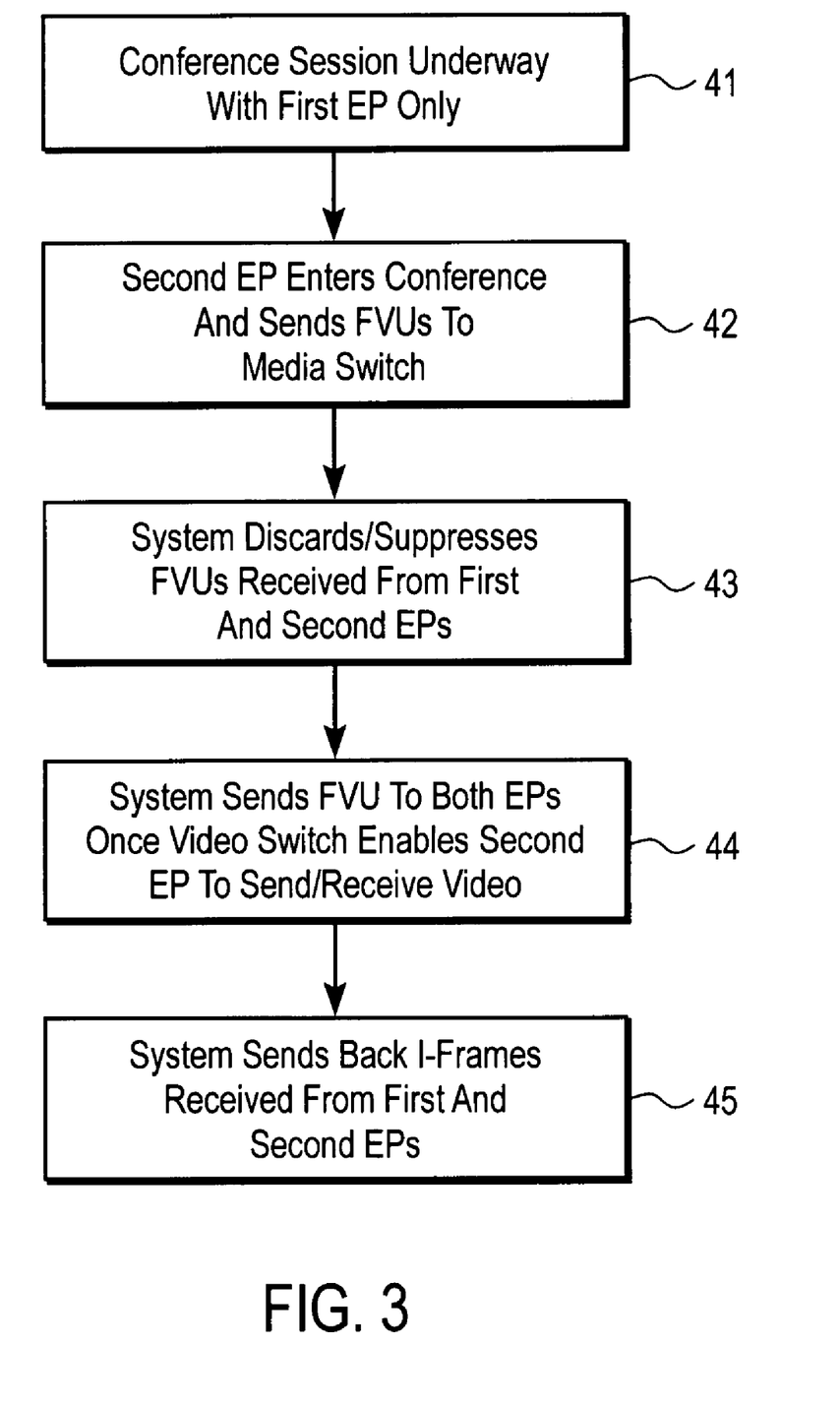
FIG. 3 illustrates another example method of fast video update for the situation where a second video endpoint joins in a conference session.

FIG. 3 illustrates another example method of fast video update for the situation where a second video endpoint joins the conference session. In other words, the method shown in FIG. 3 begins where the method of FIG. 2 ends. A video conference session is underway with a first endpoint having been synchronized to the video switch and receiving back the video image captured by the first endpoint's associated camera (block 41). When a second participant enters the conference, his endpoint begins attempting to receive the video from the first endpoint, which may result in the second endpoint sending FVUs to receive an I-frame (block 42).

Note that in this embodiment the second video endpoint is considered an active speaker upon entering the session. That is, the conferencing system is configured to output images of the most recent speaker and the next most recent speaker. That means that the system needs to switch from just sending back an image of the first participant (associated with the first endpoint) to sending back separate video output streams to each endpoint of the other participant. In other words, the system needs to send the first endpoint an image of the second participant, and the second endpoint an image of the first participant. Alternatively, the system may output a composite image of both the first and second participants to both endpoints.

Thus, with only two endpoints in the conference session, the video system produces two video streams so that the first and second participants may see each other. To achieve this result, the video conferencing system discards or suppresses all FVUs received from the first and second endpoints until after the video switch becomes enabled to handle both participants (block 43). Once the video switch becomes enabled to output the two video streams (each to the corresponding endpoint), the system synchronizes to both endpoints by sending an FVU to the first and second endpoints (block 44).

In response, the conferencing system receives a single I-frame from each of the first and second endpoints. The video conferencing server then changes its output to include image streams of both participants, sending back the I-frame received from the first endpoint to the second endpoint, and vice-versa (block 45). The video conferencing system continues to send video streams consisting of I-frames, B-frames, and P-frames to the first and second endpoints.

Figure 4:
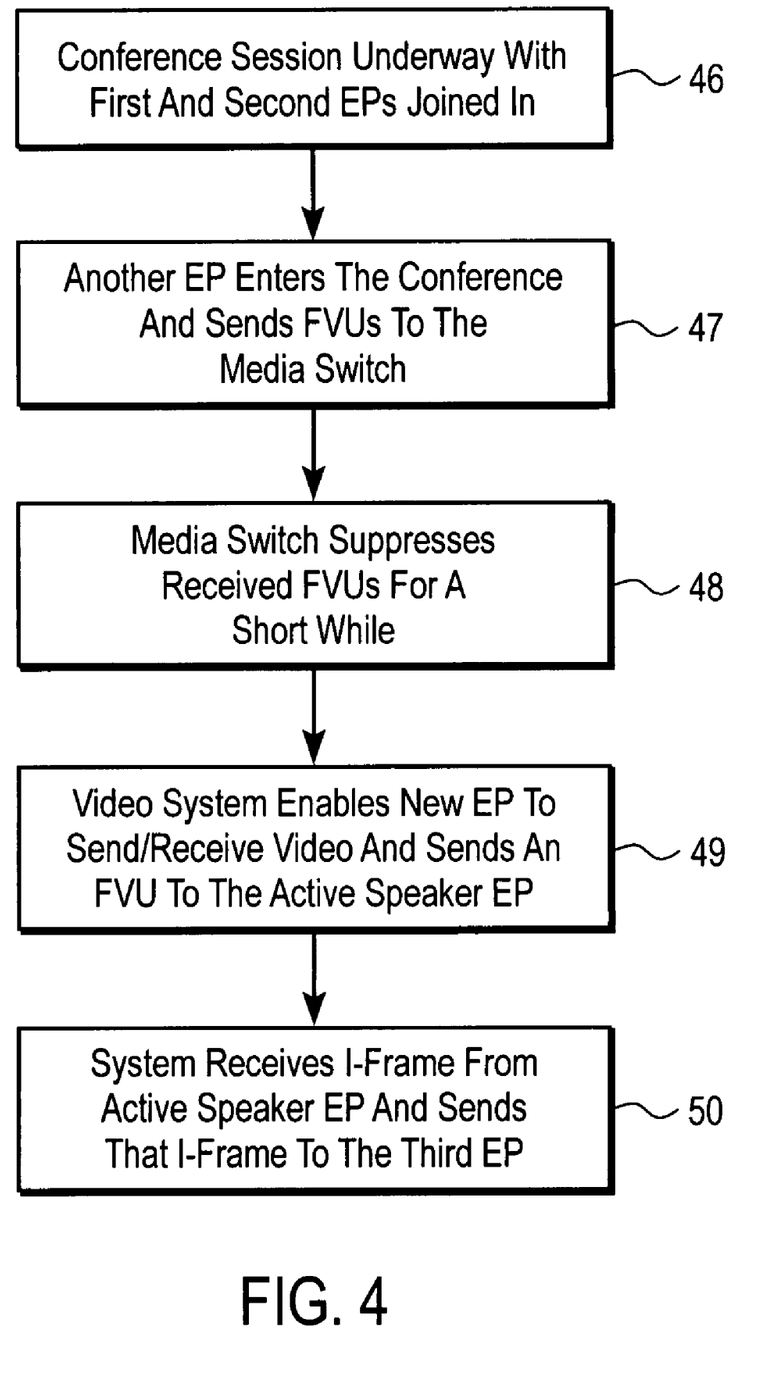
FIG. 4 illustrates yet another example method for a fast video update for the situation where a third video endpoint joins in a conference session.

FIG. 4 illustrates yet another example method for a fast video update for the situation where a third (or fourth, or fifth, etc.) video endpoint now joins in a conference session. Practitioners in the art will appreciate that video conferencing systems are typically configured so that all of the video participants see the current active speaker. In the case where a conference session is underway with two video endpoints already joined in, as additional participants enter the conference, they are neither active nor previous speakers. These newly joined participants want to receive an image of the active speaker as quickly as possible.

Thus, the example method of FIG. 4 begins with a conference session underway that includes first and second video endpoints (block 46). When the video system starts receiving FVUs indicating a third endpoint has entered the conference (block 47), it immediately suppresses all received FVUs for a short time (block 48). That is, until the video switch becomes enabled with respect to the third endpoint, all FVUs from the third endpoint are discarded by the video conferencing system. The system then sends out a single FVU to the endpoint that is the active speaker (as detected by the system). This is shown in FIG. 4 by block 49. In response, the video conferencing system receives an I-frame back from the active speaker endpoint, which I-frame is then sent to the third endpoint (block 50). The third endpoint is now fully engaged in the conference session (i.e., its video stream is synchronized with the first and second endpoints) and is able to view the active speaker. The above method is applicable as subsequent endpoints (i.e., a fourth, fifth, sixth, etc.) enter the conference.

Figure 5:
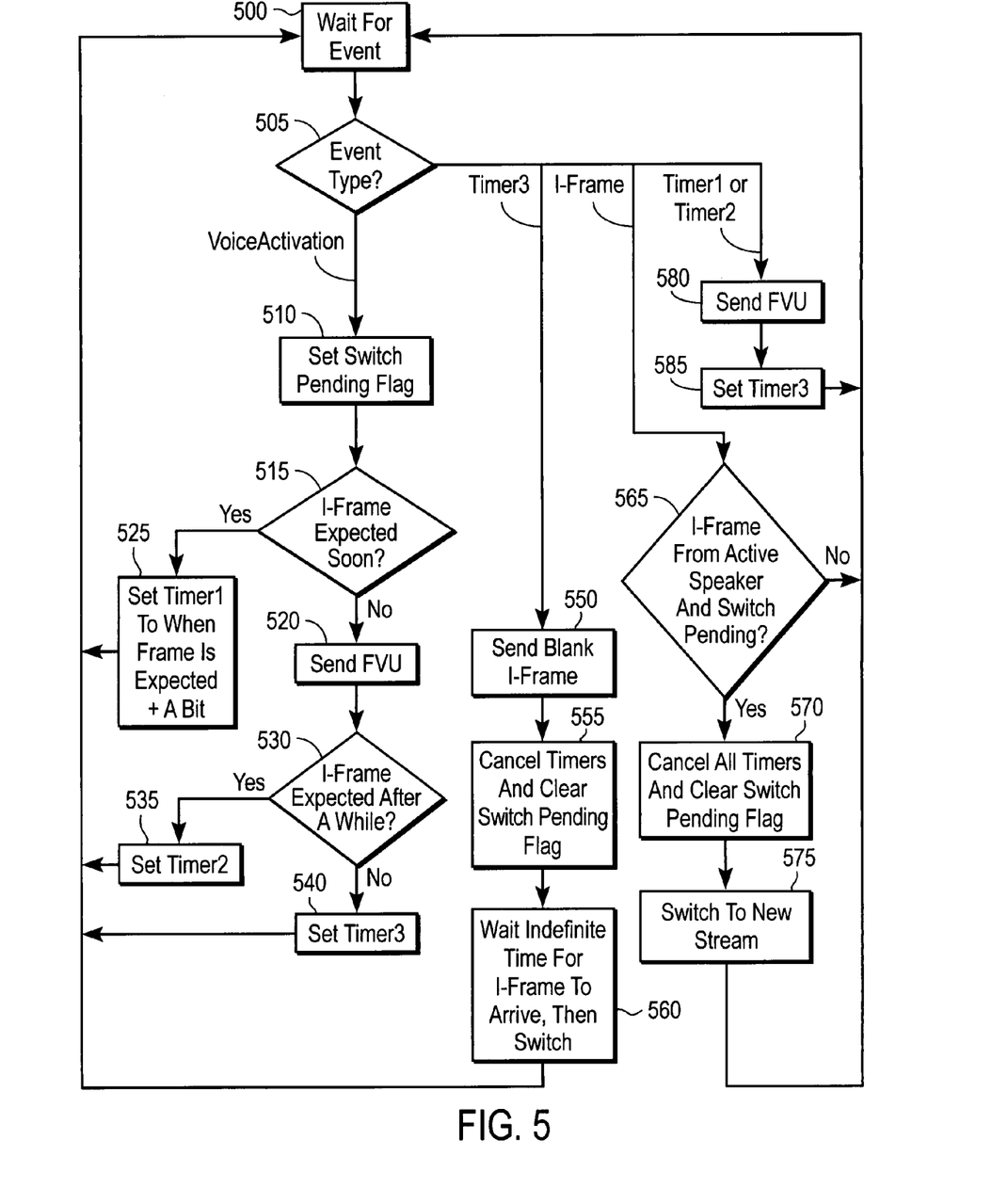
FIG. 5 illustrates still another example method for a fast video update for the situation where the active speaker changes during a conference session.

FIG. 5 illustrates an example method for allowing a video switch to control the sending and receiving of fast video updates for a set of endpoints where the active speaker changes during the conference session. The method shown minimizes the number of FVUs that are sent to the active speaker's endpoint. Not only does each FVU consume network bandwidth, but the response to the FVU results in more I-frames than have been budgeted for in the group of pictures (GOP). Each GOP contains a single I-frame typically followed by a predefined sequence of B-frames and P-frames. If FVUs result in many more I-frames being sent than would be sent in a normal sequence of GOPs, network bandwidth limits may be greatly exceeded.

The embodiment of FIG. 5 begins with the conferencing system (e.g., server) waiting for an event. This waiting step is shown by block 500. The event triggering a transition out of the waiting state can be an indication that the current speaker has changed, that an I-frame has been received, or that one of three timers has expired. The type of triggering event is determined in block 505.

By way of example, if the event is a voice activation event (i.e., a new active speaker), control proceeds to block 510, where the video system notes that the video from the new active speaker should be switched to all endpoints except the active speaker's endpoint once an I-frame has been received from the active speaker's endpoint. It is appreciated that switching before an I-frame is received may result in P-frames and/or B-frames from the active speaker's GOP being associated with an I-frame from the previous speaker's GOP, resulting in corruption of the video image. The method enables waiting for the I-frame by setting a "video switch pending" flag to be true (block 510). The video system then makes a determination about how soon the next I-frame might be expected from the new active speaker (block 515). This determination can be made, for example, by noting the time when the most recent I-frame was received from the endpoint and then computing an expected arrival time for the next I-frame based on the number of frames in the endpoint's GOP, the frame rate being sent by the endpoint, and the video system's current time.

In the event that another I-frame is expected within a relatively short period, control passes to block 525, where a first timer is set for an interval equal to the expected arrival time of the next I-frame plus a very small additional amount of time. The video system then returns to block 500 to wait for another event. On the other hand, if the next I-frame is not expected within a relatively short period, the video system instead sends an FVU to the active speaker's endpoint (block 520). Practitioners will appreciate that there may be different reasons why the I-frame is not expected to arrive shortly.

In block 530, the video system tests to see whether the frames currently being received in the GOP are such that the I-frame isn't expected for an unacceptably long time following the active speaker change. If so, control passes to block 535 where, since an FVU has already been sent, the video system expects the I-frame to be received sooner than the position in the GOP would indicate. The system therefore sets a second timer to an interval sufficient to allow the endpoint to be able to receive the FVU, process it, and send an I-frame back to the video system. Control then passes back to block 500 to await a new event.

If the position in the GOP is not the reason why the I-frame is not expected for some time, then it is possible that the packets corresponding to the frame have been dropped or damaged. In this rare scenario, control passes to block 540, where a third timer is set to a relatively long time interval, equal to a small integral (e.g., 3-4×) multiple of the GOP time.

This provides enough time for the endpoint of the active speaker to send another I-frame. Control then passes back to block 500 to await another event.

If the received event is determined to be the arrival of an I-frame, control passes to block 565, where the system queries whether two conditions are true: whether the I-frame is from the active speaker and the video "switch pending" flag is set. If either of these conditions is untrue, the I-frame is not considered to be of sufficient interest, and control passes back to block 500 to await another event. But if both conditions are true, this means that an I-frame for triggering the switch to the new active speaker has arrived. In response, all timers are reset and the "video switch pending" flag is cleared, i.e., set to false (block 570). Next, the video system switches its output stream such that the video received from the active speaker's endpoint now becomes the major output stream (block 575). This switching operation requires that the I-frame and all subsequent frames from the active speaker's endpoint are replicated and sent to every other endpoint in the conference session, except the active speaker's endpoint.

Note that the active speaker's endpoint is already receiving the video stream from the previous speaker's endpoint, thereby preventing the active speaker from seeing his own image. This stream continues to be switched to the active speaker's endpoint uninterrupted; no FVU is needed to facilitate the receipt of this stream. Once the switchover to the active speaker's stream is complete, control returns to block 500 to await another event.

If the received event is caused by the expiration of either the first timer, (which is set to await an I-frame that should have arrived very soon after a voice activation event was received) or the expiration of the second timer (which is set after a FVU has already been sent) then control passes to block 580. At this point, either the I-frame did not show up at the proper spot in the GOP, or a previously sent FVU failed to result in an I-frame. In either case, the system responds by sending another FVU. The third timer is then set to a period equal to a small integral multiple of the GOP time (block 585). Control then passes back to block 500.

Should the received event be caused by the expiration of the third timer, then an unusual condition has occurred that has prevented multiple I-frames in a small number of GOPs from being received. In this case, control passes to block 550, where a pre-configured I-frame is sent to all endpoints except the active speaker's endpoint. This pre-configured I-frame may represent a blank video picture or another still picture, indicating that an error has occurred. The video system then cancels all outstanding timers and sets the video "switch pending" flag to false (block 555). The video system then proceeds to wait an indefinite amount of time for an I-frame to arrive from the active speaker's endpoint Once that happens, the system switches all endpoints (except the active speaker's endpoint) to the active speaker's endpoint's video stream. The exceptional condition having been removed, control then returns to block 500 to await the next event.

It is appreciated that the time intervals to be set for the first, second and third timers may be arbitrarily set based on various considerations, e.g., the characteristics of the GOP associated with the active speaker's video stream, how long it is reasonable to wait for a video picture change following a change in active speaker, etc.

Figure 6:
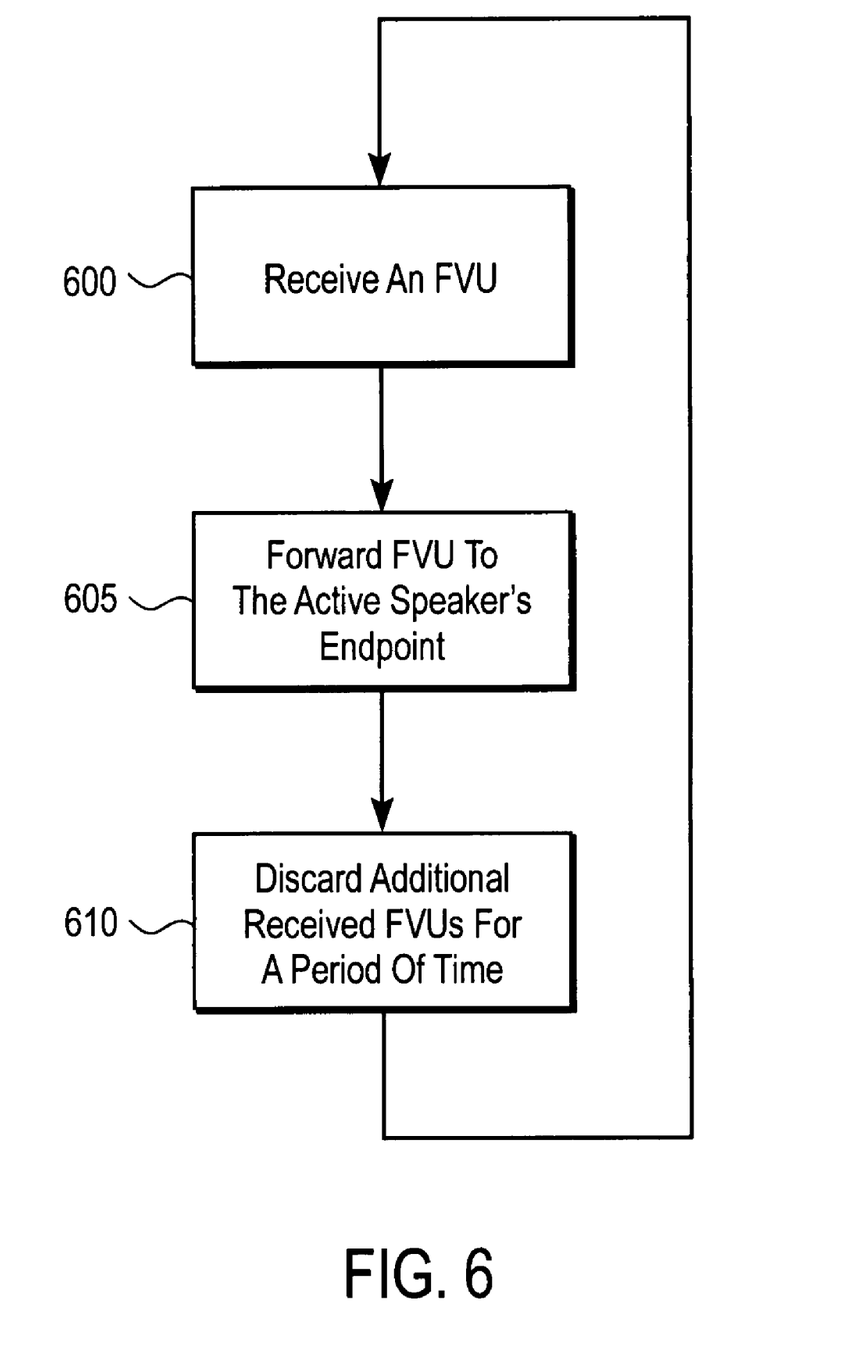
FIG. 6 illustrates an example method for fast video update suppression in response to a dropped I-frame.

FIG. 6 illustrates an example method for fast video update suppression in response to a dropped I-frame. Ordinarily, when the video stream from the active speaker's endpoint to the video switch loses an I-frame due to network congestion or packet damage, all receiving endpoints receive the damaged stream. Receipt of such a damaged video stream may result in all endpoints sending an FVU to the video switch, each attempting to receive back an intact I-frame as soon as possible. Since there may be hundreds of such endpoints in a conference, forwarding all of their FVUs to the active speaker's endpoint could result in the endpoint collapsing under the FVU load or, even worse, sending a long succession of I-frames and vastly exceeding the budgeted bandwidth for the video stream.

The embodiment of FIG. 6 starts at block 600, where a first FVU is received from any endpoint other than the active speaker's endpoint. The system forwards the first FVU to the active speaker's endpoint (block 605). Any additional FVUs received in the next period of time (i.e., a predetermined time interval) are discarded (block 610). Once the predetermined time interval has expired, normal FVU processing resumes, and control returns to block 600. It is appreciated that the time interval during which FVUs are blocked may be arbitrarily set to any appropriate period. Common time intervals may be a few seconds.

Practitioners in the networking and multicasting arts will further appreciate that the embodiments described above are transparent to the client devices. The present invention is also not limited to video applications but may also be useful to other communication technologies.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
   dropping an initial series of video frames received by a video conferencing system from a first endpoint that has entered a video conference session as a first participant;
   discarding one or more fast video update (FVU) messages received by the video conferencing system from the first endpoint during an enabling time period;
   sending a single FVU message to the first endpoint after the video conferencing system has enabled to send and receive a video stream in the video conference session;
   receiving an I-frame from the first endpoint in response to the single FVU message; and sending, by the video conferencing system, the I-frame back to the first endpoint.

2. The method of claim 1 wherein the initial series of video frames contains at least a portion of a video image of a user captured by the first endpoint.

3. The method of claim 1 wherein the sending of the single FVU occurs after a video switch of the video conferencing system enables the first endpoint to send and receive a video stream in the conference.

4. A method comprising:
synchronizing a first endpoint to a video switch of a video conferencing system, the first endpoint having entered a video conference session hosted by the video conferencing system as a first participant;
receiving one or more fast video update (FVU) messages from a second endpoint that has entered the video conference session as a second participant;
suppressing all fast video update (FVU) messages received from the first and second endpoints during an enabling time period;
receiving, responsive to a single FVU message sent to the first and second endpoints, a first I-frame from the first endpoint and a second I-frame from the second endpoint; and
sending, by the video conferencing system, the first I-frame to the second endpoint and the second I-frame to the first endpoint.

5. The method of claim 4 wherein the first I-frame contains at least a portion of a video image of the first participant, and second I-frame contains at least a portion of a video image of the second participant.

6. The method of claim 4 further comprising waiting to send the single FVU message until after the video conferencing system has enabled the first and second endpoints to send and receive a video stream in the video conference session.

7. The method of claim 4 further comprising:
detecting that a new endpoint has entered the video conference session; and
suppressing the one or more fast video update FVU messages received from the new endpoint during an additional enabling time period.

8. The method of claim 7 further comprising:
detecting speech from a third endpoint such that the third endpoint becomes a current active speaker, the third endpoint being included among a plurality of endpoints previously entered in the video conference session, the plurality of endpoints including the first and second endpoints;
sending out a single FVU to the third endpoint;
receiving an I-frame from the third endpoint; and
sending the I-frame to the new endpoint.

9. The method of claim 8 wherein the new endpoint is associated with an additional participant to the video conference session.

10. The method of claim 8 wherein the I-frame sent to the new endpoint comprises an image of a user of the third endpoint.

11. A method comprising:
sending, in a video conference session among a plurality of endpoints which includes a first endpoint as a current active speaker and a second endpoint as a previous active speaker, a first video image received from the second endpoint to the first endpoint, while simultaneously sending a second video image received from the first endpoint to the second endpoint and also to a remaining set of the endpoints;
detecting speech from a third endpoint such that the third endpoint becomes the current active speaker;
determining whether an expected arrival time of an I-frame from the third endpoint is less than a first predetermined time interval; if so, then
waiting to receive a next I-frame from the third endpoint without sending a fast video update (FVU) message; otherwise
sending the FVU message to the third endpoint.

12. The method of claim 11 further comprising:
receiving, in response to sending the FVU message to the third endpoint, an I-frame from the third endpoint;
sending the I-frame to the second endpoint and to every one of the set of remaining endpoints, excluding the third endpoint.

13. A method comprising:
sending, in a video conference session among a plurality of endpoints which includes a first endpoint as a current active speaker and a second endpoint as a previous active speaker, a first video image received from the second endpoint to the first endpoint, while simultaneously sending a second video image received from the first endpoint to the second endpoint;
detecting speech from a third endpoint such that the third endpoint becomes the current active speaker;
setting a switch pending flag;
determining whether an expected arrival time of an I-frame from the third endpoint is less than a first predetermined time interval; if so, then
waiting to receive a next I-frame from the third endpoint without sending a fast video update (FVU) message; otherwise
sending the FVU message to the first endpoint;
determining whether the I-frame has yet to be received from the third endpoint for a time period greater than either the first predetermined time interval or a second predetermined time interval longer than the first predetermined time interval; if so, then
sending the FVU message to the first endpoint; and
determining whether the I-frame has yet to be received from the third endpoint for a time period greater than a third predetermined time interval, the third predetermined time interval being longer than the first and second predetermined time intervals; if so, then
sending a preconfigured I-frame indicative of an error condition to the first, second, and third endpoints; and
clearing the switch pending flag.

14. The method of claim 13 wherein the preconfigured I-frame comprises a blank image.

15. The method of claim 13 wherein the preconfigured I-frame comprises a single visual image.

16. The method of claim 13 wherein in the event that the I-frame is received from the third endpoint in a time period less than either the first, second, or third predetermined time intervals, and the switch pending flag is set, then further comprising:
clearing the switch pending flag; and
sending a third video image received from the third endpoint to the first and second endpoints, while simultaneously sending the second video image received from the first endpoint to the third endpoint.

17. A method comprising:
starting a timer responsive to a fast video update FVU message being sent to a source endpoint during a session hosted by a video conferencing system;
suppressing forwarding to the source endpoint FVU messages received by the video conferencing system during a predetermined time interval commencing with the starting of the timer; and forwarding to the source endpoint FVU messages received by the video conferencing system after the predetermined time interval has elapsed.

18. The method of claim 17 further comprising sending an FVU in response to the dropping of a video packet on a destination stream.

19. Logic encoded in one or more non-transitory, computer-readable media for execution and when executed is operable to:
send, in a video conference session among a plurality of endpoints which includes a first endpoint as a current active speaker and a second endpoint as a previous active speaker, a first video image received from the second endpoint to the first endpoint, and also send a second video image received from the first endpoint to the second endpoint and also to a remaining set of the endpoints;
detect speech from a third endpoint such that the third endpoint becomes the current active speaker;
set a switch pending flag;
determine whether an expected arrival time of an I-frame from the third endpoint is less than a first predetermined time interval; if so, then
wait to receive a next I-frame from the third endpoint without sending a fast video update (FVU) message; otherwise
send the FVU message to the first endpoint;
determine whether the I-frame has yet to be received from the third endpoint for a time period greater than either the first predetermined time interval or a second predetermined time interval longer than the first predetermined time interval; if so, then
send the FVU message to the first endpoint; and
determine whether the I-frame has yet to be received from the third endpoint for a time period greater than a third predetermined time interval, the third predetermined time interval being longer than the first and second predetermined time intervals; if so, then
send a preconfigured I-frame indicative of an error condition to the first, second, and third endpoints; and
clear the switch pending flag.

20. The logic of claim 19 wherein the preconfigured I-frame comprises a blank image.

21. The logic of claim 19 wherein the preconfigured I-frame comprises a single visual image.

22. Logic encoded in one or more non-transitory, computer-readable media for execution and when executed is operable to:
synchronize a first endpoint to a video switch of a video conferencing system;
receive one or more fast video update (FVU) messages from a second endpoint that has entered the video conference session;
suppress all fast video update (FVU) messages received from the first and second endpoints during an enabling time period;
send FVU messages to the first and second endpoints;
receive, responsive to the FVU messages sent to the first and second endpoints, a first I-frame from the first endpoint and a second I-frame from the second endpoint; and
send the first I-frame to the second endpoint and the second I-frame to the first endpoint.

23. The logic of claim 22 wherein, when executed, is further operable to:
receive one or more fast video update FVU messages indicating a new endpoint has entered the video conference session; and
suppress the one or more fast video update FVU messages received from the new endpoint during an additional enabling time period.

24. The logic of claim 22 wherein, when executed, is further operable to:
detect speech from a third endpoint such that the third endpoint becomes a current active speaker, the third endpoint being included among a plurality of endpoints previously entered in the video conference session, the plurality of endpoints including the first and second endpoints;
send out a single FVU to the third endpoint;
receive an I-frame from the third endpoint; and
send the I-frame to the new endpoint.

25. Logic encoded in one or more non-transitory, computer-readable media for execution and when executed is operable to:
drop an initial series of video frames received from a first endpoint that has entered a video conference session as a first participant;
discard one or more fast video update (FVU) messages received from the first endpoint during an enabling time period;
send a single FVU message to the first endpoint following the enabling time period;
receive an I-frame from the first endpoint in response to the single FVU message; and
send the I-frame back to the first endpoint.

26. Logic encoded in one or more non-transitory, computer-readable media for execution and when executed is operable to:
start a timer responsive to a fast video update FVU message being sent to a source endpoint during a session hosted by a video conferencing system;
suppress forwarding to the source endpoint FVU messages received by the video conferencing system during a predetermined time interval commencing with the starting of the timer; and
forward to the source endpoint FVU messages received by the video conferencing system after the predetermined time interval has elapsed.

* * * * *